US012431652B2

(12) United States Patent
Liao et al.

(10) Patent No.: US 12,431,652 B2
(45) Date of Patent: Sep. 30, 2025

(54) ELECTRICAL SOCKET WITH IMPROVED CONTACTS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Fang-Jwu Liao, New Taipei (TW); Ming-Lun Szu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 455 days.

(21) Appl. No.: 17/901,111

(22) Filed: Sep. 1, 2022

(65) Prior Publication Data

US 2023/0074510 A1 Mar. 9, 2023

(30) Foreign Application Priority Data

Sep. 3, 2021 (CN) ......................... 202111031641.X

(51) Int. Cl.
*H01R 13/20* (2006.01)
*H01R 107/00* (2006.01)

(52) U.S. Cl.
CPC ......... *H01R 13/20* (2013.01); *H01R 2107/00* (2013.01)

(58) Field of Classification Search
CPC ..... H01R 13/02; H01R 2107/00; H01R 13/14
USPC ............................................................ 439/74
See application file for complete search history.

(56) References Cited

U.S. PATENT DOCUMENTS

| | | | | |
|---|---|---|---|---|
| 9,425,525 | B2 | 8/2016 | Walden et al. | |
| 10,003,150 | B1 | 6/2018 | Ju et al. | |
| 10,116,080 | B1 * | 10/2018 | Ju | H01R 12/714 |
| 10,651,584 | B2 | 5/2020 | Hsu | |
| 11,411,337 | B2 | 8/2022 | Liao | |

(Continued)

FOREIGN PATENT DOCUMENTS

| | | | |
|---|---|---|---|
| CN | 202178433 U | | 3/2012 |
| CN | 113054455 A | * | 6/2021 |

OTHER PUBLICATIONS

Translated text of CN-113054455-A (Year: 2021).*

*Primary Examiner* — Abdullah A Riyami
*Assistant Examiner* — Amara Anderson
(74) *Attorney, Agent, or Firm* — Ming Chieh Chang

(57) ABSTRACT

An electrical socket includes: a housing defining plural passageways; and plural contacts in the corresponding passageways, respectively, each of the contacts including a fixing part, first and second elastic parts with first and second inclined portions and longitudinal grooves, and first and second abutting parts, wherein the first abutting part has a third inclined portion and a first extension portion and the second abutting part has a fourth inclined portion and a second extension portion, and a highest point of the longitudinal groove of the first elastic part is substantially leveled with an intersection point of the third inclined portion and the first extension portion and a lowest point of the longitudinal groove of the second elastic part is substantially leveled with an intersection point of the fourth inclined portion and the second extension portion.

6 Claims, 7 Drawing Sheets

(56) References Cited

U.S. PATENT DOCUMENTS

| | | | | |
|---|---|---|---|---|
| 2005/0174746 | A1* | 8/2005 | Hsiao | H05K 7/1061<br>361/769 |
| 2022/0285874 | A1* | 9/2022 | Cheng | H01R 13/41 |

* cited by examiner

ELECTRICAL SOCKET WITH IMPROVED CONTACTS

CROSS-REFERENCE TO RELATED APPLICATION

This application claims priority to China Patent Application No. 202111031641.X filed on Sep. 3, 2021 which is incorporated herein by reference in its entirety.

BACKGROUND OF THE INVENTION

Field of the Invention

The present invention relates generally to an electrical socket, particularly to an electrical chip socket for receiving an electronic package, such as a central processing unit (CPU).

Description of Related Arts

With the vigorous development of concepts such as big data, cloud computing, and the internet, almost every new product needs high-speed transmission. Each application module is developing towards high speed to realize the high-speed transmission so an input/output interface used to connect each module also needs high-speed transmission. A CPU, which is a core part of a computer or server, is developing towards higher speed and needs more pins. An electrical connector used to connect the central processing unit and a motherboard also should be improved and not become a bottleneck for signal transmission. When the high-frequency signals are transmitted, signal loss is relatively large, which affects the transmission of high-frequency signals.

China Patent No. 107394448 discloses an electrical connector, which is capable of transmitting high-frequency signals and has terminals with multiple conductive paths, comprises an insulating body with multiple passageways, a plurality of contacts disposed in the corresponding passageways, respectively. Each contact includes a base part and an elastic arm extending upward from the base part with a first contacting portion for upwardly contacting a docking element. The contact further includes a first abutting part bending from the first contacting portion, and a bent arm with a second contacting portion for downwardly contact another docking element and a second abutting part bending from the second contacting portion. The first abutting part includes a first elastic part and a second elastic part, the first elastic part extends downwardly from the first contacting portion and bends gradually away from the base part, and the second elastic part extends from the end of the first elastic part and bends gradually close to the base part. A first longitudinal groove is set on the contact and spans the first contacting portion and the first elastic part and the second elastic part The first longitudinal groove not only can reduce the self-inductance phenomenon but also can avoid crosstalk between adjacent terminals in the signal transmission, thus improving the high-speed signal transmission of the contact.

In order to enable the terminals to be retained in the terminal passageways, the first abutting part and the second abutting part and the bent arm are respectively provided with abutting points which elastically contact with the inner wall surface of the passageways. However, the contacts of this structure are difficult to install, and the retention of the contacts in the passageways are unstable.

SUMMARY OF THE INVENTION

The objective of the present invention is to provide an electrical socket that has a stable contact-holding effect and an improved impedance.

To achieve the above object, an electrical connector is provided, comprising a housing defining an upper surface and a lower surface opposite to each other, and passageways arranged in a matrix and extending through the upper surface and the lower surface; conductive contacts disposed in the passageways, respectively, each of the contacts comprising a fixing part, a first elastic part extending upward from the fixing part and a first abutting part bent downward from the first elastic part, and a second elastic part extending downward from the fixing part and a second abutting part bent upward from the second elastic part, the first elastic part defining a first contacting portion and the second elastic part defining a second contacting portion, the first and second abutting parts moving toward each other and contacting with each other to establish an electrical connection between the first and second abutting parts; wherein the first elastic part comprises a first vertical portion extending upward from the fixing part and a first inclined portion extending obliquely from the first vertical portion and located above the upper surface of the housing, and the second elastic part comprises a second vertical portion extending downward from the fixing part and a second inclined portion extending obliquely from the second vertical portion and located below the lower surface of the housing, the first vertical portion and the second vertical portion are coplanar with each other.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
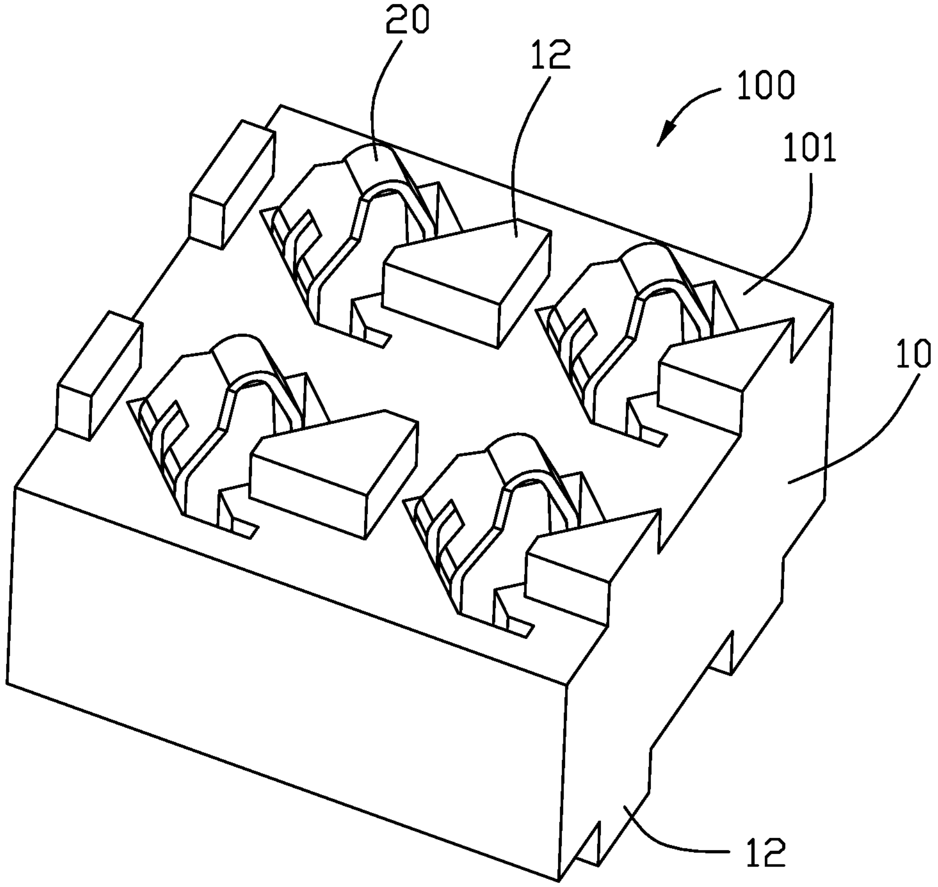
FIG. 1 is a perspective view of an electrical socket of an embodiment of this present invention.

Referring to FIGS. 1-7, an electrical socket 100 in accordance with the present invention is an electrical chip socket which is adapted for receiving a chip module (not shown) and establishing an electrical connection between the chip module and a circuit board (not shown). The electrical socket 100 comprises a housing 10 made from insulative material and defining opposite upper surface 101 and lower surface 102, and contacts 20 arranged in a matrix pattern. The housing 10 defines a plurality of passageways 11 extending through the upper surface 101 and the lower surface 102 in a vertical direction. The plurality of contacts 20 are received within the corresponding passageways 11 respectively. FIG. 1 only illustrates a part of the housing 10 and four contacts 20. The number of the contacts of the electrical connector 100 varies depending on the kind of the chip module. For example, the electrical connector 100 used in a server has thousands of the contacts.

Figure 3:
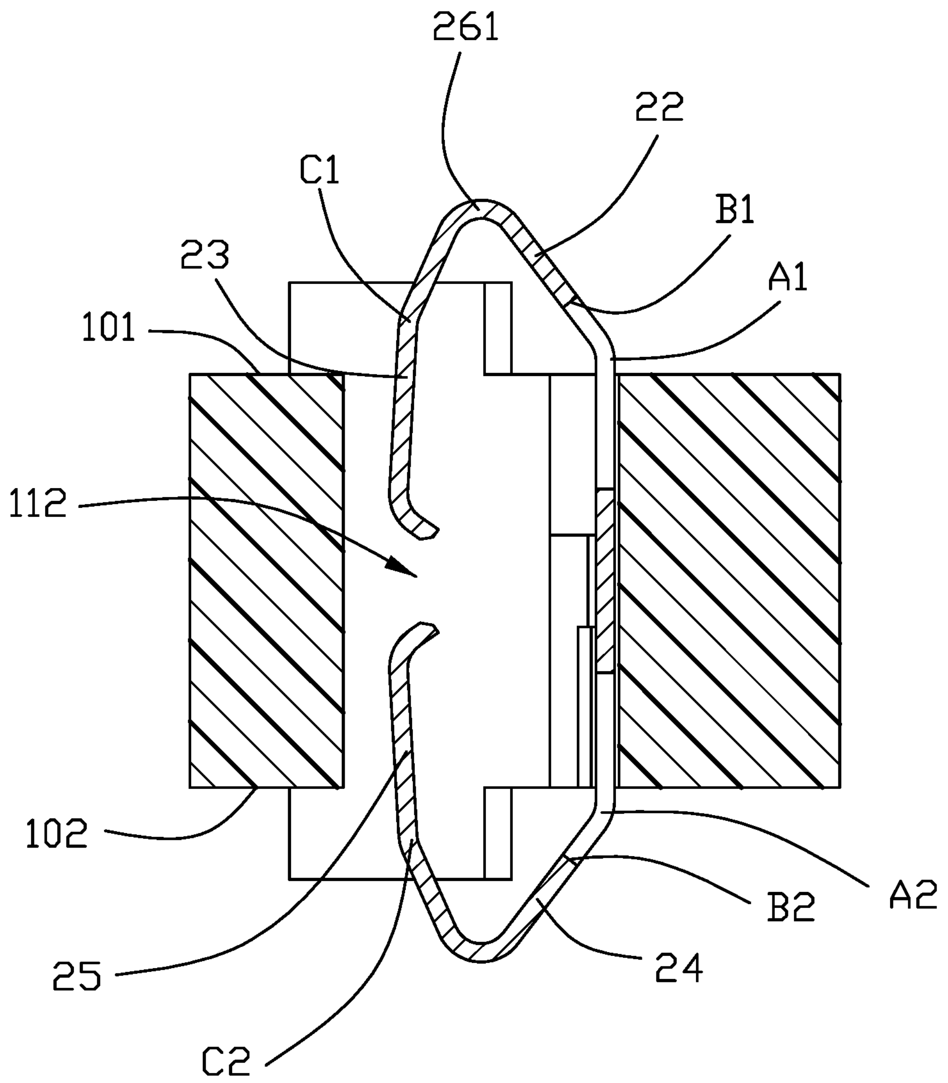
FIG. 3 is a cross-sectional view of the electrical socket taken along line 3-3 in FIG. 2.
Figure 4:
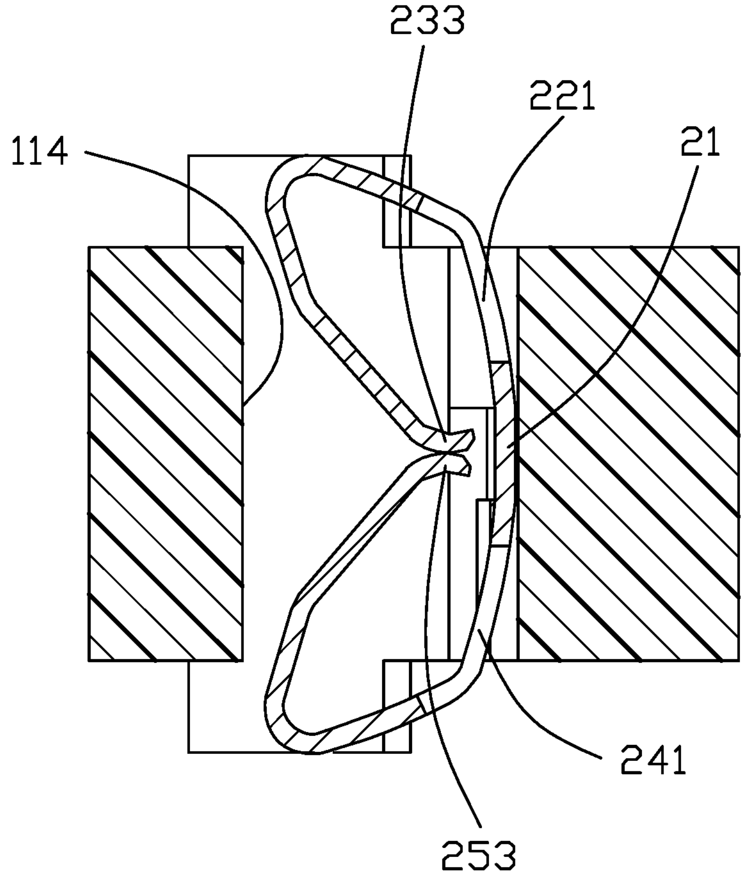
FIG. 4 is similar to FIG. 3 showing the contact is compressed.
Figure 5:
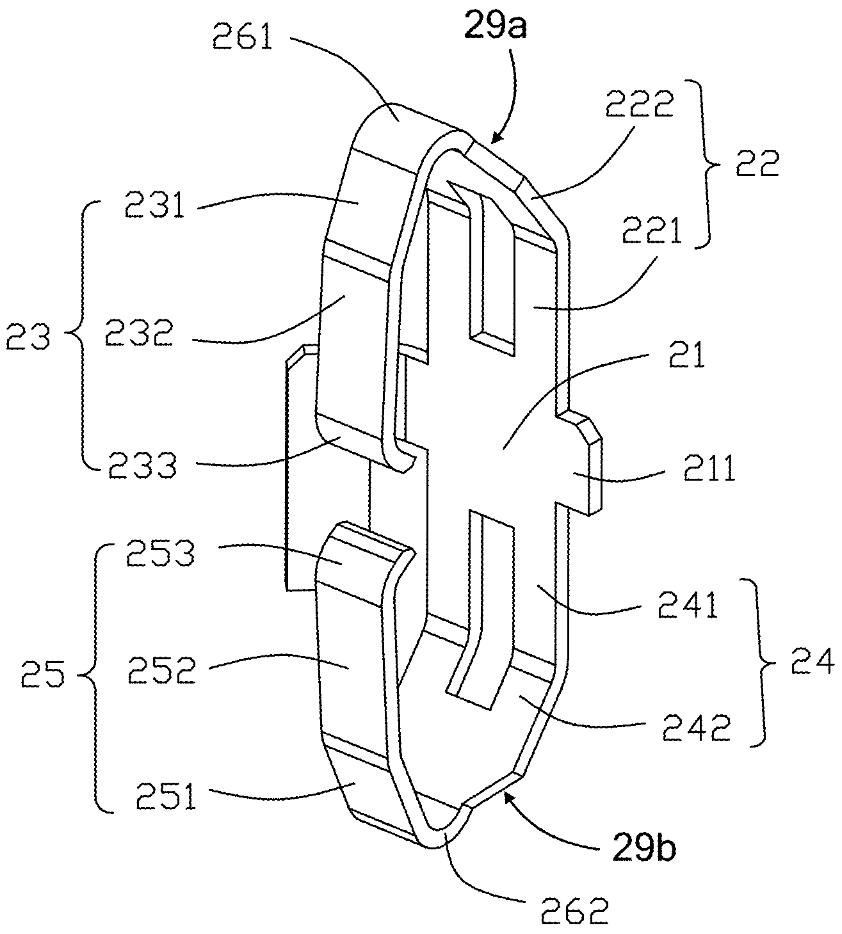
FIG. 5 is a perspective view of the contact.
Figure 6:
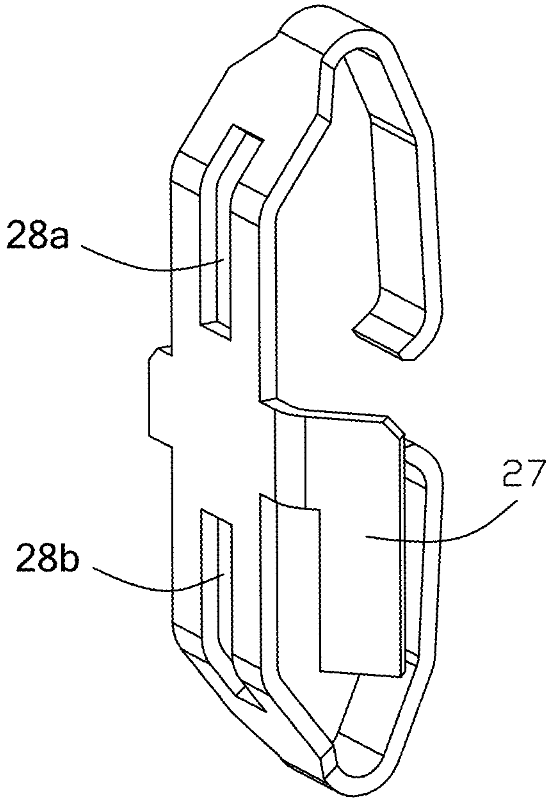
FIG. 6 is another perspective view of the contact of FIG. 5.
Figure 7:
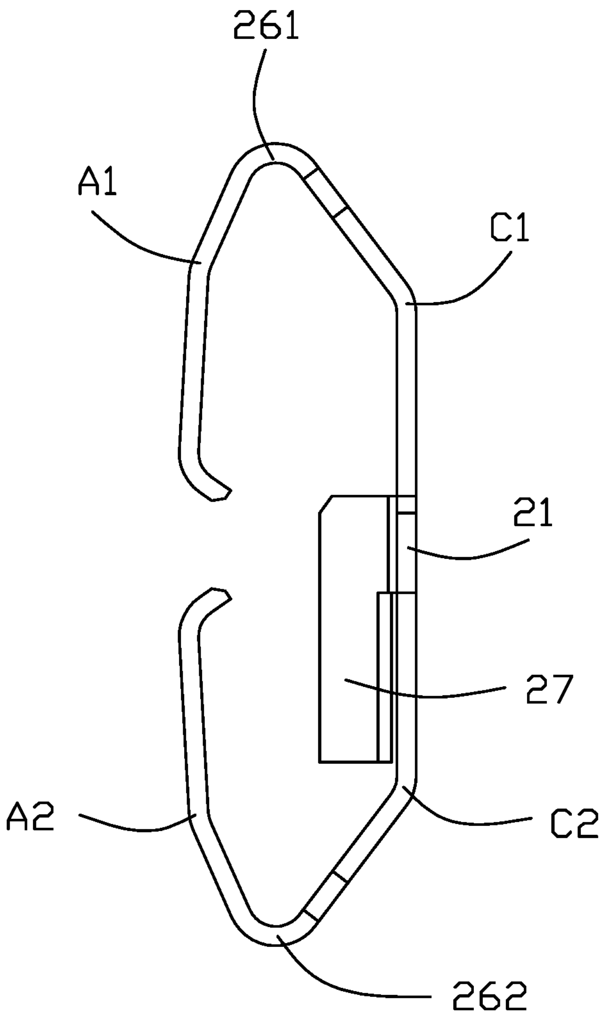
FIG. 7 is a side view of the contact of FIG. 5.

The contact 20 includes a fixing part 21, a first elastic part 22 with a first contacting portion 261, a first abutting part 23 bent downward from the first elastic part 22, a second elastic part 24 with a second contacting portion 262, and a second abutting part 25 bent upward from the second elastic part 24. As shown in FIG. 4, the first and second abutting parts 23, 25 abut against and electrically connect to each other when the contact 10 is pressed, the improvement of the present invention is that the first elastic part 22 includes a first vertical portion 221 extending upward from the fixing part 21, and a first inclined portion 222 extending obliquely from the first vertical portion 221 and is exposed above the upper surface 101 of the housing, and the second elastic part 24 includes a second vertical portion 241 extending downward from the fixing part 21 and a second inclined portion 242 extending obliquely from the second vertical portion 241. When the contact 20 is in an uncompressed or free state, the first and second vertical portions 221, 241 are coplanar with each other and coplanar with the fixing part 21. As shown in FIG. 3, the upper and lower ends of the contacts 20 of the present invention are both in a form of elastic connection urged by pressing, which is different from a conventional structure that the upper end is elastically pressed to get contact with the chip module and the lower end is soldered to the circuit board which need high requirements for the contacts to be stably held in the housing and for elastic properties of the first and second elastic parts. The contacts 20 of the present invention are relatively thin and long in the up-down direction, so that the contacts can ensure to keep a certain elasticity and improve an impedance and crosstalk between adjacent contacts during high-frequency signal transmission. Please note, the first and second mentioned in the present invention are used to distinguish similar structures with a similar name, not mean in order. In the embodiment, a direction facing the chip module is top, and a direction facing the circuit board is bottom.

The first contacting portion 261 is located at the highest point of the first inclined portion 222, and the first abutting part 23 includes a third inclined portion 231 inclining downward from the first inclined portion 222 and a first extension portion 232 extending downward from the third inclined portion 231. The first extension portion 232 has a first abutting end 233 bending inward at a distal free end thereof. The second contacting portion 262 is located at the lowest point of the second inclined portion 242, and the second abutting part 25 includes a fourth inclined portion 251 that inclines upward from the second inclined portion 242 and a second extension portion 252 extending upward from the fourth inclined portion 251. The second extension portion 252 has a second abutting end 253 bending inwardly at a distal free end thereof. The first and second contacting portion 261, 262 are used to make a mechanical contact to achieve an electrical connection.

Figure 2:
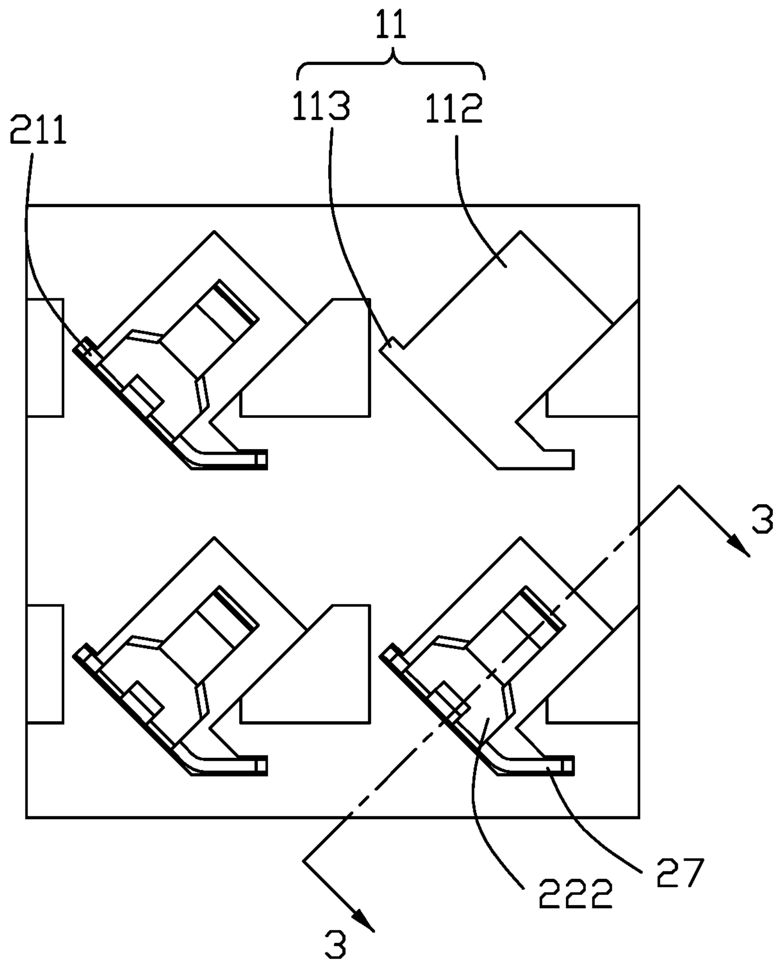
FIG. 2 is another perspective view of the electrical socket of FIG. 1, wherein a contact thereof is removed.

The passageway 11 defines a receiving hole 112 and a fixing slot 113 on a side of the receiving hole 112. The interference flanges 211 of the fixing part 21 are fixed in the fixing slot 113. The first and second elastic parts 22, 24 extend outward from the receiving hole 112, the first and second abutting parts 23, 25 extend into the receiving hole 112. One of the interference flanges 211 of the fixing part 21 is connected with a strip connecting part 27, looking down from the upper surface 101 (as shown in FIG. 2), the first and second inclined portions 222, 242 are arranged at an angle of 45 degrees with a strip connecting part 27 respectively. In this embodiment, the strip connecting part 27 is fixed in the fixing slot 113 by interference, and the corresponding interference flange 211 connected to the strip connecting part 27 is only used for connection. The first and second elastic parts 22, 24 each define a longitudinal groove **28*a* or 28*b* extending along an extending direction thereof, respectively. The upper and lower surfaces of the housing 10 also define support blocks 12. As shown in FIGS. 3 and 4, the inner wall surface of the passageway 11, especially the inner wall surface corresponding to the fixing part 21, the first and second vertical parts 221, 241 is in a vertical plane, and the inner wall surface 114 facing the first and second abutting parts 23, 25** is also in a vertical plane.

As shown in FIG. 3, in an uncompressed or free state, the first extension portion 232 is facing and substantially parallel to the first vertical portion 221, and the second extension portion 252 is facing and substantially parallel to the second vertical portion 241. The intersection point A1 of the first vertical portion 221 and the first inclined portion 222 located above the upper surface 101 of the housing 10, and the intersection point A2 of the second vertical portion 241 and the second inclined portion 242 is located below the lower surface 102 of the housing 10. As shown in FIG. 4, the first and second elastic parts 22, 24 are elastically displaced with the upper and lower edges of the fixing part 21 as supporting points to generate deformation. Relatively speaking, the first and second vertical portions of the present invention can increase the elasticity of the first and second elastic parts.

In terms of height along the up-down direction, the highest point B1 of the longitudinal groove **28*a* in the first elastic part 22 is at a same height or substantially leveled with the intersection point C1 of the third inclined portion 231 and the first extension portion 232. The lowest point B2 of the longitudinal groove 28*b* in the second elastic part 24 is at a same height or substantially leveled with the intersection point C2 of the fourth inclined portion 231 and the second extension portion 232. The intersection point C1 of the third inclined portion 231 and the first extension portion 232 is between the first contacting portion 261 and the intersection point A1 formed by the first vertical portion 221 and the first inclined portion 222 while the intersection point C2 of the fourth inclined portion 231 and the second extension portion 232 is between the second contacting portion 262 and the intersection point A1 formed by the second vertical portion 221 and the second inclined portion 222. Please note, the first vertical portion 221 and the first extension portion 232 are jointed together via an inverted V-shaped part 29*a* which is formed by the first inclined portion 222 and the third inclined portion 231, the first contacting portion 261 is located at a peak of the inverted V-shaped part 29*a*. Similar, the second vertical portion 241 and the second extension portion 232 are jointed together via a V-shaped part 29*b* which is formed by the second inclined portion 222 and the fourth inclined portion 231, the second contacting portion 262 is located at a peak of the V-shaped part 29*b*. The inverted V-shaped part 29*a* is located above the upper surface 101 of the housing 10 and the V-shaped part 29*b* is located below the lower surface 102 of the housing 10. The first and the second extension portions 232 are with a gap to the inner surface of the corresponding passageway even under a condition that the inverted V-shaped part 29*a* and the V-shaped part 29*b* are urged to partly move into the passageways. The contact 20** is symmetrical in the vertical direction.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical socket comprising:

a housing defining an upper surface and a lower surface opposite to each other and passageways arranged in a matrix and extending through the upper surface and the lower surface; and conductive contacts disposed in the passageways, respectively, each of the contacts comprising a fixing part, a first elastic part extending upward from the fixing part, a first abutting part bent downward from the first elastic part, a second elastic part extending downward from the fixing part, and a second abutting part bent upward from the second elastic part, the first elastic part defining a first contacting portion and the second elastic part defining a second contacting portion, the first and second abutting parts being able to move toward and contact each other to establish an electrical connection between the first and second abutting parts;

wherein the first elastic part comprises a first vertical portion extending upward from the fixing part and a first inclined portion extending obliquely from the first vertical portion and located above the upper surface of the housing, the second elastic part comprises a second vertical portion extending downward from the fixing part and a second inclined portion extending obliquely from the second vertical portion and located below the lower surface of the housing, and the first vertical portion and the second vertical portion are coplanar;

wherein the first abutting part comprises a third inclined portion bent downward from the first inclined portion and a first extension portion bent downward from the third inclined portion continually, the first extension portion has a first abutting end bent inwardly at a distal free end thereof, the second abutting part comprises a fourth inclined portion bent upward from the second inclined portion and a second extension portion bent upward from the fourth inclined portion continually, the second extension portion has a second abutting end bent inwardly at a distal free end thereof, and the first abutting end and the second abutting end are designed to touch each other to establish the electrical connection;

wherein each of the first elastic part and the second elastic part defines a longitudinal groove extending along an extending direction thereof; and wherein a highest point of the longitudinal groove of the first elastic part is at a height substantially leveled with an intersection point of the third inclined portion and the first extension portion, and a lowest point of the longitudinal groove of the second elastic part is at a height substantially leveled with an intersection point of the fourth inclined portion and the second extension portion.

2. The electrical socket as claimed in claim 1, wherein the first extension portion and the second extension portion are substantially parallel to the first and second vertical portions.

3. The electrical socket as claimed in claim 1, wherein an intersection point of the first vertical portion and the first inclined portion is located above the upper surface, and an intersection point of the second vertical portion and the second inclined portion is located below the lower surface.

4. The electrical socket as claimed in claim 1, wherein the intersection point of the first extension portion and the third inclined portion is higher than an intersection point of the first vertical portion and the first inclined portion.

5. The electrical socket as claimed in claim 1, wherein the longitudinal groove of the first elastic part extends from the first inclined portion to the first vertical portion and the longitudinal groove of the second elastic part extends from the second inclined portion to the second vertical portion.

6. The electrical socket as claimed in claim 1, wherein the first inclined portion and the third inclined portion of each of the contacts constitute a first inverted V-shaped part and the second inclined portion and the fourth inclined portion of each of the contacts constitute a second V-shaped part.

* * * * *